(No Model.)
O. L. KOHNERT.
PNEUMATIC TIRE.
No. 597,831. Patented Jan. 25, 1898.
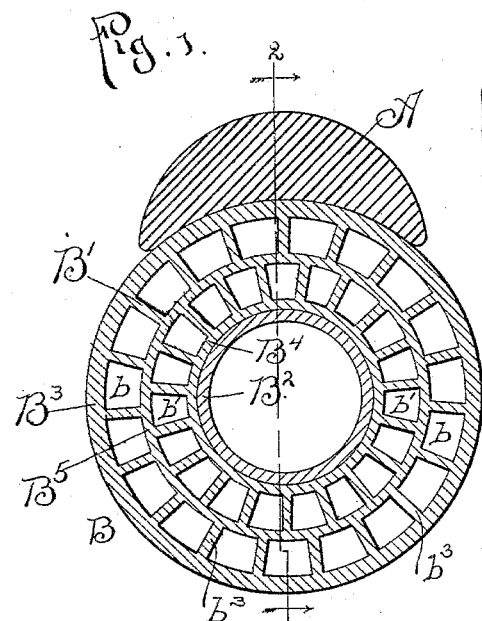
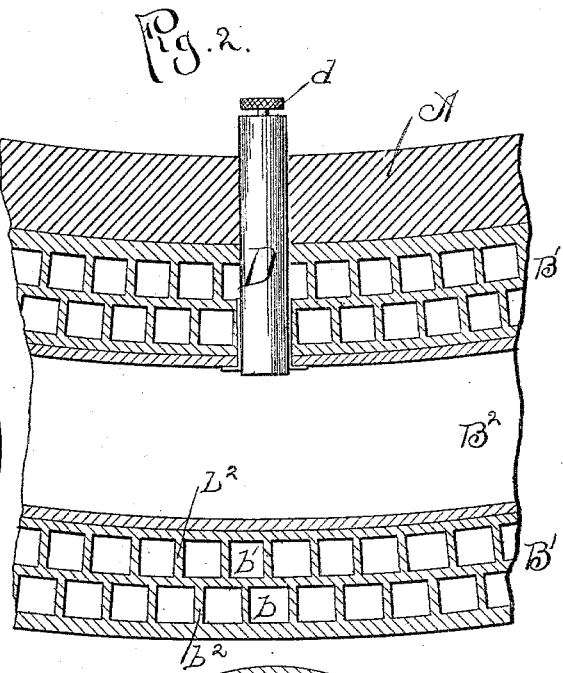
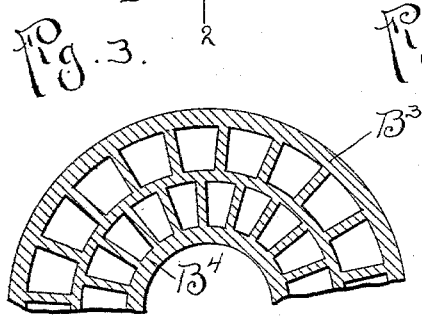
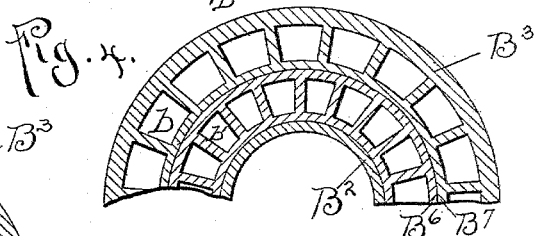
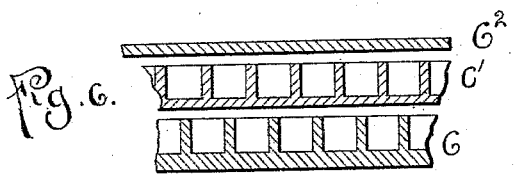
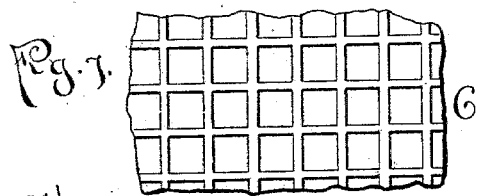
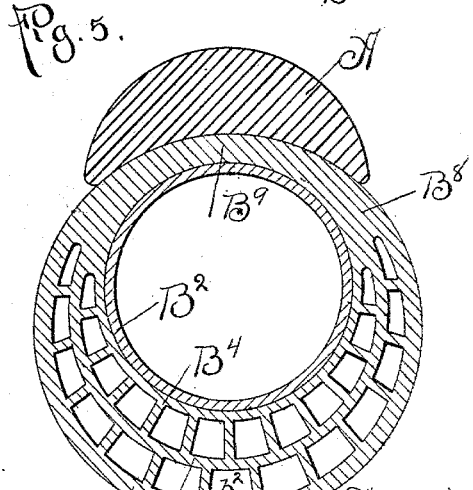
Witnesses:
J. B. Keir.
L. Clinton Hamlick
Inventor
Otto L. Kohnert
by Dayton, Poole & Brown Attys

UNITED STATES PATENT OFFICE.

OTTO L. KOHNERT, OF CHICAGO, ILLINOIS.

PNEUMATIC TIRE.

SPECIFICATION forming part of Letters Patent No. 597,831, dated January 25, 1898.

Application filed May 2, 1896. Serial No. 589,967. (No model.)

*To all whom it may concern:*

Be it known that I, OTTO L. KOHNERT, of Chicago, in the county of Cook and State of Illinois, have invented certain new and useful Improvements in Pneumatic Tires; and I do hereby declare that the following is a full, clear, and exact description thereof, reference being had to the accompanying drawings, and to the letters of reference marked thereon, which form a part of this specification.

This invention relates to an improvement in pneumatic bicycle-tires, having reference more especially to means by which the escape of air from such tires by puncture may be prevented.

The invention consists in the matters hereinafter described, and pointed out in the appended claims.

A bicycle-tire constructed in accordance with my invention embraces as its principal feature a cellular layer or thickness of rubber surrounding the inner tubular part in which the air is confined, such cellular part being provided with a large number of cells which are separated by integral radially-arranged walls, each of which is closed or air-tight, but which contains air under normal pressure, such cellular layer affording a thick covering surrounding the air-tube, which in case of injury to or puncture of the tire will protect the air-tube itself from injury, while at the same time giving to the tire as a whole the soft or yielding character necessary to a successful use of the tire.

The invention also includes other features of improvement in tires of the kind referred to, as will hereinafter more fully appear.

The invention may be better understood by reference to the accompanying drawings, in which—

Figure 1 is a view in cross-section of the wheel rim and tire, illustrating one desirable form of my invention. Fig. 2 is a longitudinal section of the same, taken on line 2 2 of Fig. 1. Figs. 3 and 4 are sectional views of the tire alone, illustrating modified constructions thereof embodying the general features of the invention. Fig. 5 is a cross-sectional view of the wheel rim and tire, showing a form thereof somewhat different from that shown in Fig. 1. Fig. 6 illustrates in cross-section the parts or layers of which the tire may be constructed or built up in the, manufacture of the same. Fig. 7 is a face view of one of the cellular layers shown in Fig. 6.

As illustrated in Fig. 1, A indicates the wheel-rim, and B the tire. In this instance the said tire consists of two separate parts— namely, an outer cellular portion B' and an inner air-tube B², these being separate from or unattached to each other. The external cellular part B' in this instance is provided with two annularly-arranged series of cells $b$ $b'$, formed by means of an exterior wall B³, an inner wall B⁴, and an intermediate wall or partition B⁵, together with transverse and longitudinally-arranged radial walls or partitions $b^2$ $b^3$, forming a large number of cells generally rectangular in form, the longitudinal walls of which are radially arranged with respect to the center of the tire as a whole, as clearly seen in Fig. 1.

The cellular structure described may be made or built up of rubber, as illustrated in Figs. 6 and 7, wherein C C' indicate two cellular layers in which the cells are open at one side, and C² a flat layer, which may form the outer or inner wall of the cellular part of the tire. The cells in each cellular layer may be arranged as shown in Fig. 7, the same being formed by partition-walls arranged at right angles with each other; but the cells may obviously be of other shape than square, with practically the same result in the operation of the tire. The cellular layers C C' may be constructed in a familiar manner by the use of suitable molds, the partition-walls being made or molded integral with the body part of the layer. After the layers C C' C² have been made as described they are connected with each other in a manner familiar to manufacturers of rubber, thereby forming an integral cellular mass wherein the several cells are air-tight and have no communication with each other.

The inner air-tube B² (illustrated in Figs. 1 and 2) will usually be provided with a filling-tube D, having a valve $d$, as seen in Fig. 2, said filling-tube being secured to the wall of the tube B² and passing outwardly through the external cellular layer B' of the tire. Such inner tube may be inclosed within the outer cellular layer in the process of manufacture by building up the cellular layer around said inner tube, so as to permanently inclose the same, or the said inner tube may be inserted through a slit or opening formed in the outer cellular layer, as is common in that class of tires having a removable air-tube.

In Fig. 3 I have shown a construction in which the inner air-tube as a separate part is absent and wherein the inner wall $B^4$ of the external cellular layer or tube is made of suitable thickness to form the inner tube itself, air-pressure in this case being applied directly within the said inner wall $B^4$.

In Fig. 4 is shown a construction in which the tire consists of three separate parts or layers—namely, an inner air-tube $B^2$ and two concentric integral cellular layers $B^6$ $B^7$, which latter are made separate from each other and placed one within the other in the process of manufacture. In this instance each of the layers $B^6$ $B^7$ will have both inner and outer walls, with which the radial walls or partitions forming the cells are permanently united in the manner illustrated.

In Fig. 5 is shown a construction in which the cellular construction in the outer layer or tube of the tire is limited to the bottom and sides of the tire. In this instance $B^8$ indicates the external cellular layer, which at its lower parts and sides is provided with outer and inner walls $B^3$ $B^4$, an intermediate partition $B^5$, and radial walls or partitions $b^2$ $b^3$ in the same manner as before described in connection with Fig. 1, but which has a solid or non-cellular inner part $B^9$ adjacent to the wheel-rim A, which solid part is made much thinner than the cellular part. This construction has the advantage of affording a larger air-tube than that shown in Fig. 1, with substantially the same results so far as the protection of the air-tube is concerned. I arrange the radial walls or partitions separating the several cells in such manner that those in the outer series of cells will be out of line with those of the inner series of cells, this construction affording more uniform elasticity than would be the case if the several partition-walls were arranged in radial alinement with each other. This particular arrangement of the partition-walls results in a protected tire that is very "sensitive" or resilient for the reason that direct pressure on any one of the radial partitions is transmitted to the center of an air-cell of the next inner series of cells, and as said partitions of one series are "staggered" or out of line with those of the next series a pulling or stretching strain exerted on a line of radial partitions will be communicated to the parallel lines of radial partitions of the next series only through the yielding medium of the wall or partition separating said two series of cells.

In all forms of the tire illustrated it is obvious that the external cellular layer may be torn or punctured in a manner to perforate one or many of the cells without liability of injury to the air-tube. In this connection it will be observed that the quantity of air held or imprisoned within the individual cells will be such as to prevent the complete collapse of the same under pressure, so that a considerable cushioning effect will be produced by the air within the cells themselves, as well as by that within the air-tube of the tire.

A special advantage is gained by the particular construction described and illustrated herein, wherein the cellular structure is formed by means of annular concentric walls and radial partitions connected with said walls, for the reason that the cellular structure of this kind may be easily and cheaply made, while at the same time the desired uniformity in cushioning effect is secured.

I claim as my invention—

1. A wheel-tire comprising a tubular member adapted for containing air, and an armor of cellular structure embodying inner, outer and intermediate annular walls, and two sets of intersecting radial walls; said annular and radial walls forming two series of closed air-cells superposed one upon the other, the radial walls of one series of cells being arranged intermediate the radial walls of the other series, substantially as described.

2. A wheel-tire comprising an inner inflatable tube, and an outer covering consisting of inner, outer and intermediate circumferential walls, and two sets of radial intersecting partition-walls integral with said circumferential walls and with each other, and forming an inner and outer series of closed cells, the radial partitions of one series being out of line with the radial partitions of the other series, substantially as described.

In testimony that I claim the foregoing as my invention I affix my signature, in presence of two witnesses, this 27th day of April, A. D. 1896.

OTTO L. KOHNERT.

Witnesses:
C. CLARENCE POOLE,
WILLIAM L. HALL.